US012515354B2

(12) United States Patent
Pagani et al.

(10) Patent No.: US 12,515,354 B2
(45) Date of Patent: Jan. 6, 2026

(54) MULTI-TOOL GRIPPER HEAD OF A SORTING APPARATUS AND OPERATING METHOD THEREOF

(71) Applicant: ASTES4 SA, Balerna (CH)

(72) Inventors: Fabio Pagani, Balerna (CH); Samuele Buschini, Balerna (CH); Roberto Zaffaroni, Balerna (CH)

(73) Assignee: ASTES4 SA, Balerna (CH)

( * ) Notice: Subject to any disclaimer, the term of this patent is extended or adjusted under 35 U.S.C. 154(b) by 603 days.

(21) Appl. No.: 17/918,709

(22) PCT Filed: Apr. 15, 2021

(86) PCT No.: PCT/IB2021/053093
§ 371 (c)(1),
(2) Date: Oct. 13, 2022

(87) PCT Pub. No.: WO2021/209932
PCT Pub. Date: Oct. 21, 2021

(65) Prior Publication Data
US 2023/0347528 A1    Nov. 2, 2023

(30) Foreign Application Priority Data

Apr. 15, 2020    (IT) .................. 102020000007903

(51) Int. Cl.
*B25J 15/00*        (2006.01)
*B21D 43/00*     (2006.01)
(Continued)

(52) U.S. Cl.
CPC ........ *B25J 15/0057* (2013.01); *B21D 43/003* (2013.01); *B25J 15/0441* (2013.01); *B25J 15/0491* (2013.01); *B25J 15/0616* (2013.01)

(58) Field of Classification Search
CPC .............. B25J 15/0057; B25J 15/0441; B25J 15/0491; B25J 15/0616; B25J 15/0425; B25J 19/0041; B21D 43/003
See application file for complete search history.

(56) References Cited

U.S. PATENT DOCUMENTS 4,604,787 A * 8/1986 Silvers, Jr. ............. B23Q 7/046
                                                                414/730
10,906,170 B2 * 2/2021 Zaffaroni ............... B25J 9/0096
(Continued)

FOREIGN PATENT DOCUMENTS

DE    102012022252 B4 * 12/2015    .......... B25J 15/0425
JP    S59 19292       2/1984
WO    2008/139409     11/2008

OTHER PUBLICATIONS

International Search Report for PCT/IB2021/053093, mailed Jul. 5, 2021, 3 pages.
(Continued)

*Primary Examiner* — Ryan J. Walters
(74) *Attorney, Agent, or Firm* — NIXON & VANDERHYE

(57) ABSTRACT

A gripping head for a handler in a sorting machine and an operating method thereof is disclosed. The gripping head includes: a support frame; a gripping tool having a socket for a control line and a first retainer; a revolver-shaped carrier on the support frame having a first releasable engagement unit coupled with the corresponding first retainer, the gripping tools furthermore having a second retainer; and a transfer platform equipped with second releasable engagement unit coupled with the second retainer. The transfer platform moves on the support frame between: a home position wherein the first retainers are engaged with the first releasable engagement unit of the carrier; an attachment position wherein the second releasable engagement units are
(Continued)

coupled with the second retainer; and an operating position wherein the first retainers are uncoupled from the first releasable engagement units and the selected gripping tool is spaced away from the carrier.

19 Claims, 17 Drawing Sheets

(51) Int. Cl.
*B25J 15/04* (2006.01)
*B25J 15/06* (2006.01)

(56) References Cited

U.S. PATENT DOCUMENTS

2016/0089792 A1* 3/2016 Ojalehto .............. B25J 15/0441
 901/50
2019/0228371 A1* 7/2019 Murphy ............... B25J 15/0616

OTHER PUBLICATIONS

Written Opinion of the ISA for PCT/IB2021/053093, mailed Jul. 5, 2021, 6 pages.

* cited by examiner

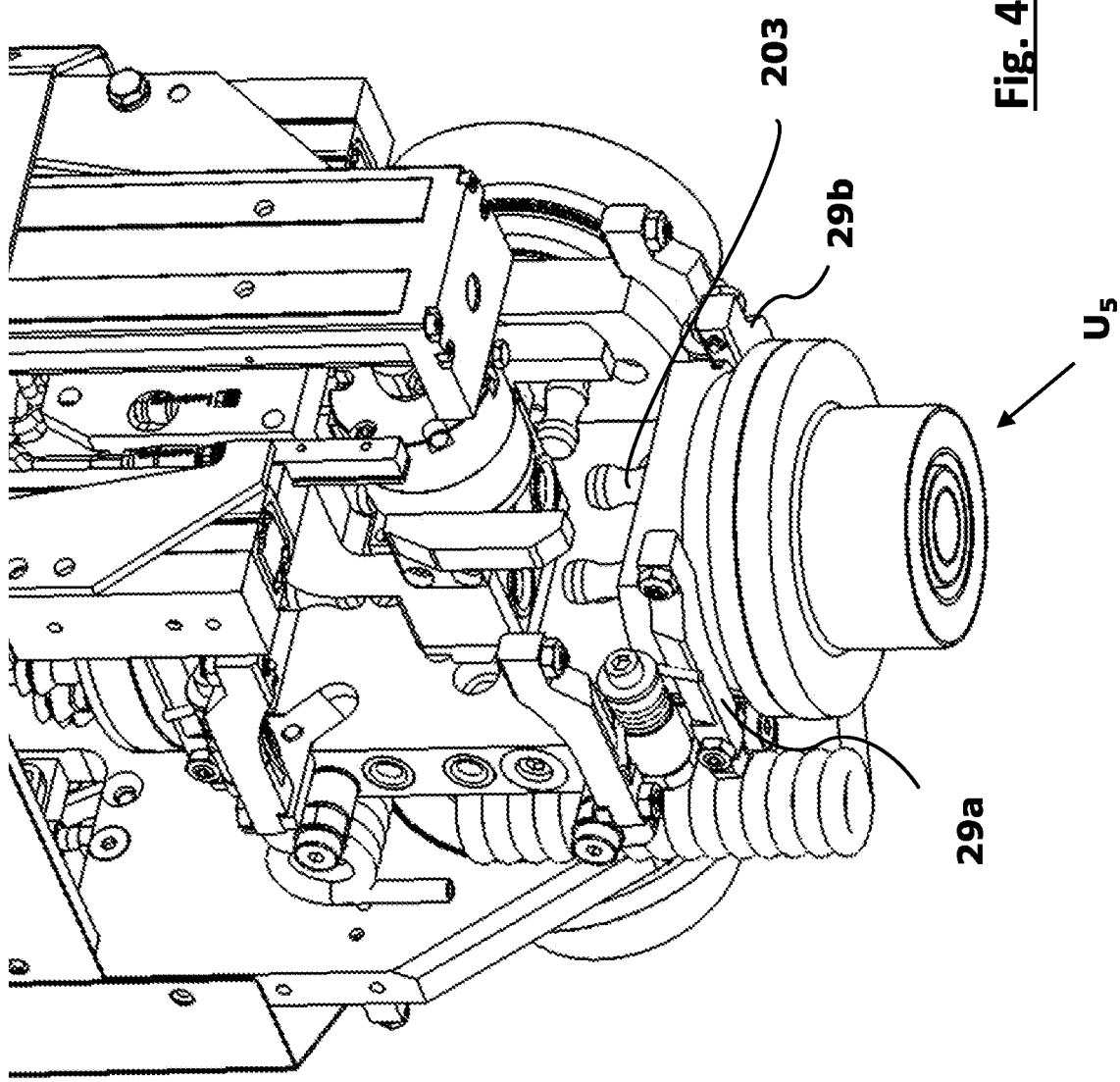

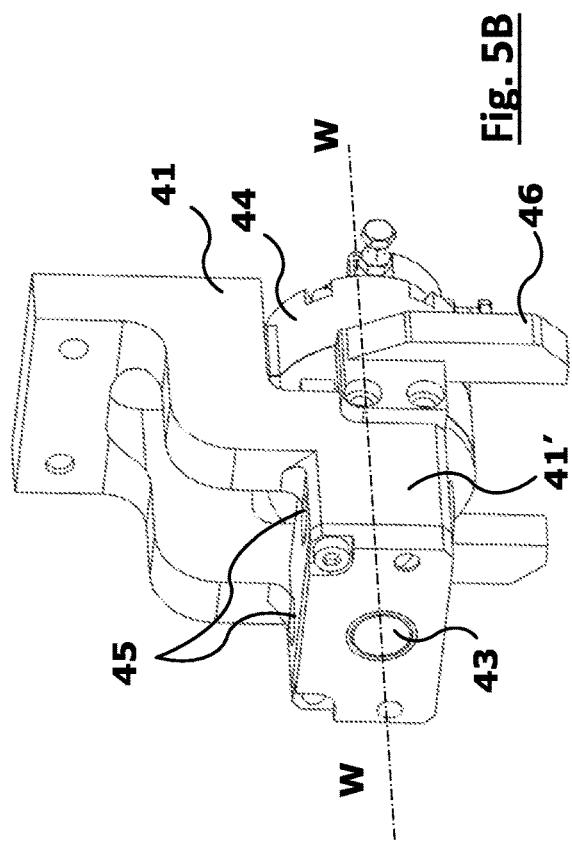
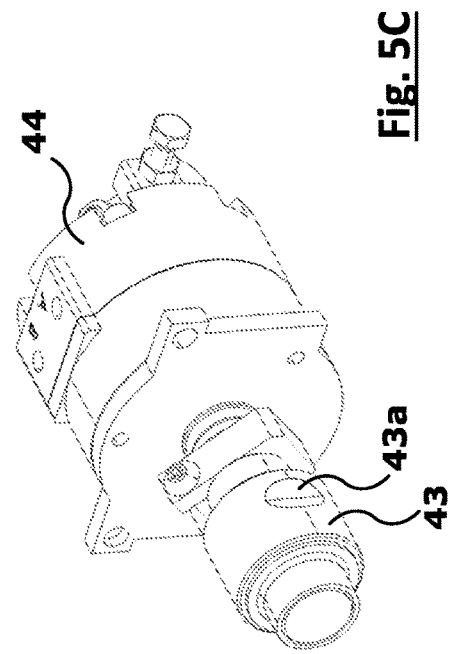
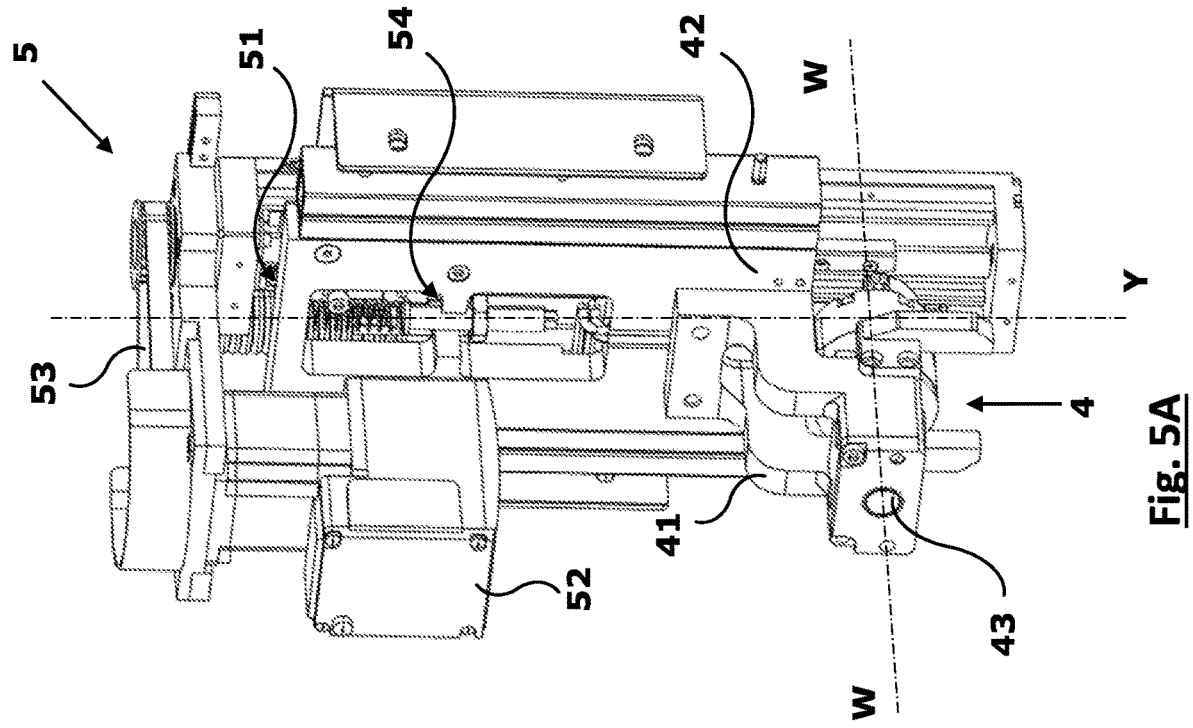

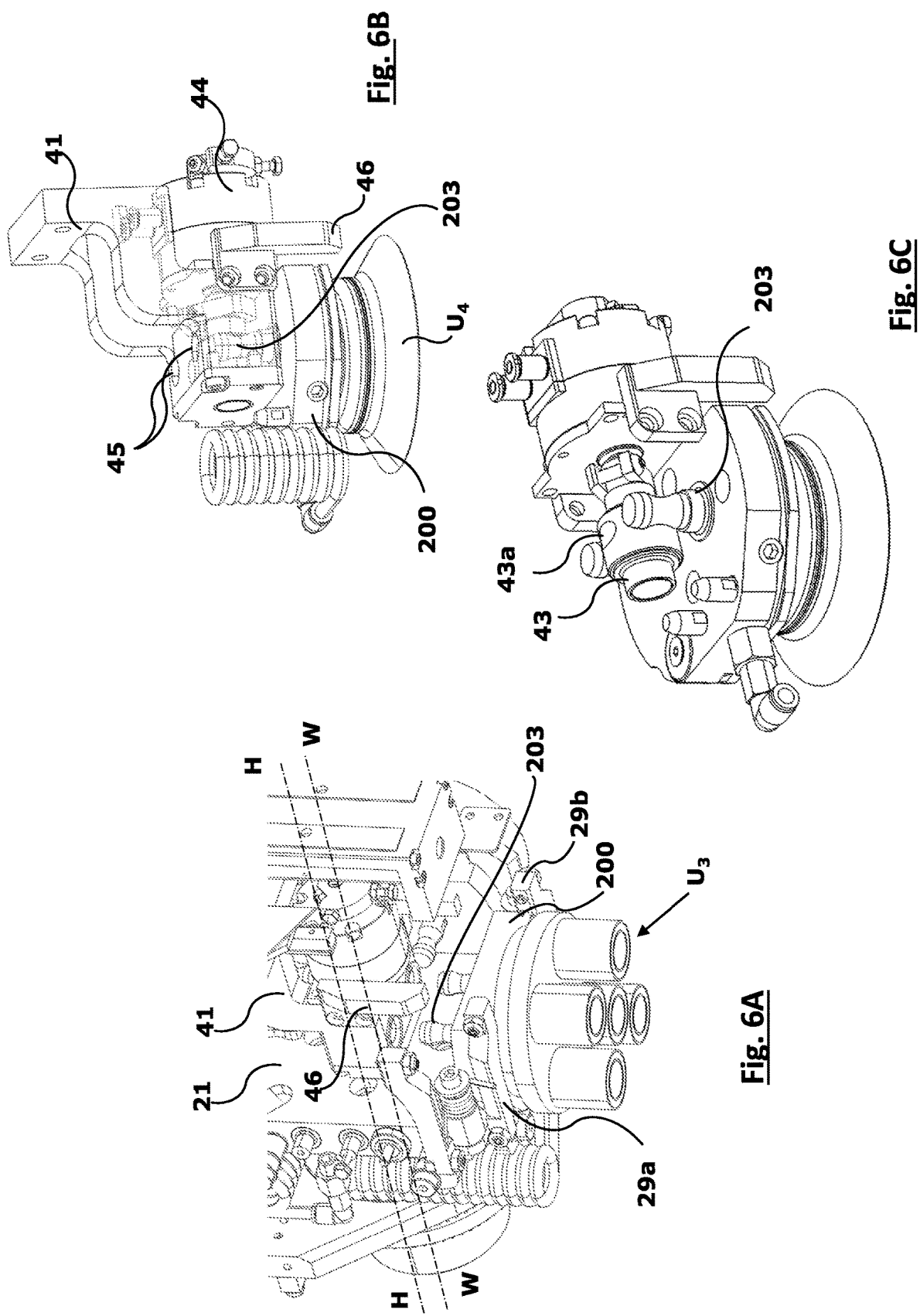

MULTI-TOOL GRIPPER HEAD OF A SORTING APPARATUS AND OPERATING METHOD THEREOF

CROSS-REFERENCE TO RELATED APPLICATIONS

This application is the U.S. national phase of International Application No. PCT/IB2021/053093 filed Apr. 15, 2021, which designated the U.S. and claims priority to IT 102020000007903 filed Apr. 15, 2020, the entire contents of each of which are hereby incorporated by reference.

BACKGROUND OF THE INVENTION

Field of the Invention

The present invention relates to the field of the handling of sheets in cutting plants. In particular, the invention relates to a multi-tool gripper head for a handler in a sorting apparatus.

Description of the Related Art

In the field of (metal, plastic, wood, composite, . . . ) sheet working, in particular in automatic cutting and sorting stations, the need to assist a cutting machine with automatic sheet handling equipment (also called handlers or sorting machines) exists, capable of drawing the raw sheets from respective warehouses, transfer them onto the introduction table in the cutting centre and then retrieve the cut pieces and the scraps to distribute them to the subsequent collection stations. A particularly effective and advantageous sorting machine is the one described for example in WO2008/139409 in the name of the same Applicant.

Typically, these machines are equipped with handlers provided with gripping heads which can operate with a plurality of workpieces having different materials, thickness and size. For such purpose, in this sector it is common practice for different interchangeable collecting tools to be apt to be engaged with handler gripping heads.

Normally, a universal fastening member is hence provided at the end of each gripping head, which can be engaged with a plurality of different operating tools, controlled with a suitable control line or energy line (pneumatic fluid, hydraulic fluid, electric current, . . . ).

The different tools are tidily stored in a tool carrier area located outside of the operating area, where the gripping heads can be led to from the sorting machine, to collect them, use them in respective operating steps and then release them at the end of a specific working step. Evidently, the step of the operating cycle wherein the gripping head is caused to interact with the tool carrier, called 'tool changing step', represents an idle time in the machine operation time and it would be desirable to be able to eliminate it.

Other fields of the art exist, for example in the field of tool machines, wherein a plurality of tools is mounted directly onboard of the same operating head. However, the technical approach used on tool machines is not immediately applicable to the sector of handlers for a series of reasons, among which mainly the bulk of the multi-tool head. As a matter of fact, operation of sorting machines requires that multiple gripping heads are allowed to interact and operate at a close mutual distance, handling also workpieces stacked at different heights each other: therefore, it is necessary that the footprint of gripping heads, for a significant height, to be as small as possible. The presence of multiple tools mounted on a multi-tool head determines a plan bulk which would be incompatible with the operation of a handler for sorting machines.

JP S59 19292 discloses changing tool machine having a selecting support cooperating with a mandrel.

U.S. 2016/0089792 discloses a machine to change end effectors stored on a linear storage, where a picking up head shall be displaced.

The need is therefore felt to provide an improved sorting apparatus, which is arranged so as to dispense of a separate tool carrier where the gripping head shall be displaced for the tool changing operations. In particular it is desired to provide a gripping head for a sorting machine which can use various types of tools, maintaining the versatility of known gripping heads, however, without suffering time and space consuming tool-changing operations.

SUMMARY OF THE INVENTION

The above-reported objects, according to the present invention are achieved by means of a gripping head of a sorting apparatus and operating method thereof having the features defined in the attached main claims. Other preferred features of the invention are defined in the dependent claims.

BRIEF DESCRIPTION OF THE DRAWINGS

Further features and advantages of the invention will in any case be more evident from the following detailed description of a preferred embodiment of the same, provided purely as a non-limiting example and illustrated in the attached drawings, wherein:

FIG. 4D is a perspective view of the head of FIG. 1 with another exemplifying gripping tool;

FIG. 5A is a perspective view, with parts removed, of the transfer platform and actuator thereof in a home condition;

FIG. 5B is a perspective view of a detail of the transfer platform of FIG. 5A;

FIG. 5C is a perspective view of the sole rotary actuator of the platform of FIG. 5B;

FIG. 6A is a perspective bottom view of the gripping head according to the invention in a home condition;

FIG. 6B is a perspective view, with parts removed and partly in transparency, of a detail of the transfer platform engaged with an exemplifying tool;

FIG. 6C is a similar view to that of FIG. 6B with the support shelf removed for clarity of illustration;

DESCRIPTION OF THE PREFERRED EMBODIMENTS

A sorting machine is normally arranged in cooperation with a cutting centre, for example a laser cutting apparatus for metal sheets (not shown). The sorting machine has the task of picking up individual raw metal sheets from a storage area, normally arranged horizontally in a stack, and to transfer them to the entry of the cutting apparatus. Once the cutting of a number of shaped workpieces from the metal sheet has been completed, the sorting machine has the further task of picking up the individual work-pieces and to transfer them in a sorted manner, possibly stacking them, to appropriate sorting positions. At the end of the work-piece transfer, even the remaining metal sheet scraps are removed by the sorting machine to a disposal location.

As can be guessed, since in the various manufacturing batches the raw sheets, the individual workpieces and the scraps can be of a very different nature, size, shape and weight, the sorting machine must employ a variety of gripping tools. For such gripping operation, the sorting machine makes use, in a manner known per se, of one or more gripping heads provided with gripping tools, mounted at the lower end of a handling arm belonging to a system with displacement axles, at least along two orthogonal axes on the horizontal plane and a vertical axis.

Figure 2:
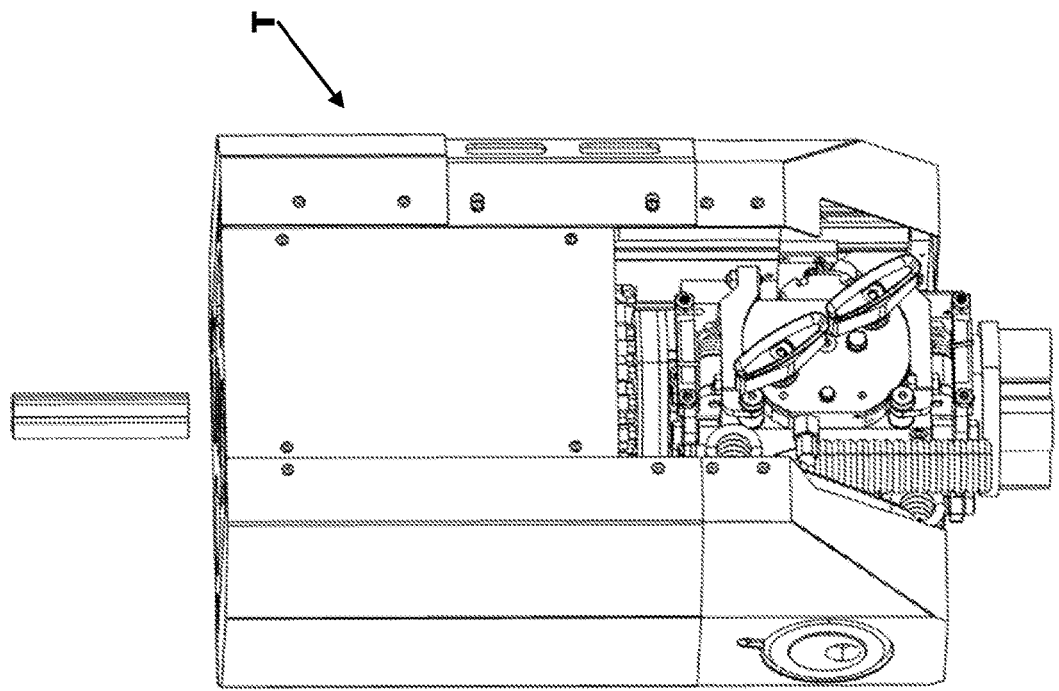
FIG. 2 is a similar view to that of FIG. 1 according to a different perspective.
Figure 1:
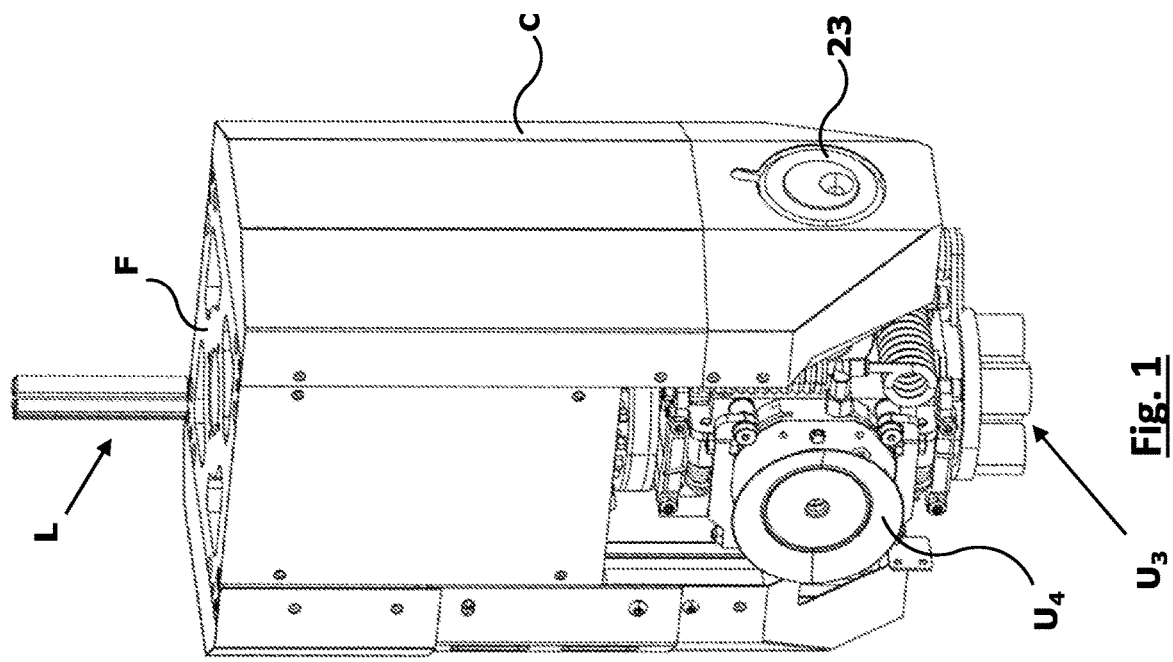
FIG. 1 is a perspective view of a gripping head according to the invention in a compact condition.

According to the invention, a gripping head T for a sorting machine consists of a housing frame which houses a plurality of tools. In FIGS. 1 and 2 gripping head T is shown in a compact home condition; the internal structure is not visible due to the presence of a cover body C; in the upper part, gripping head T ends with a flange F fastening to a moving arm of the sorting machine; through fastening flange F the control or energy transfer lines L are caused to pass—for example a vacuum pipe, a compressed air pipe, one or more electric cables and so on—for suitably controlling the members of the gripping head and the tools; in the lower part, gripping head T houses a plurality of gripping tools which will be better described further on.

Figure 3:
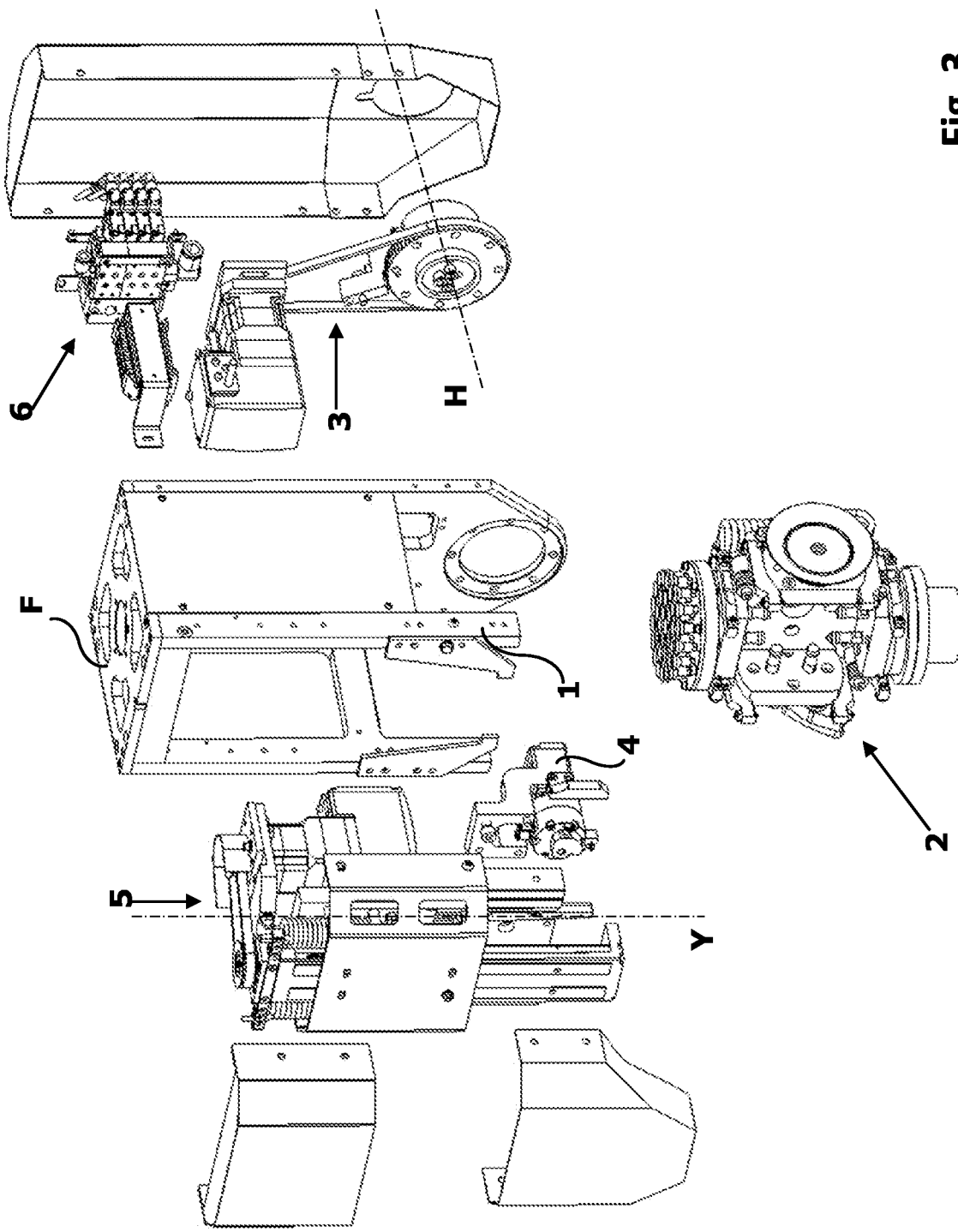
FIG. 3 is an exploded perspective view of a gripping head according to the invention.

In particular, as illustrated in FIG. 3, gripping head T consists of a support frame 1, integral with fastening flange F, whereon a series of operating components is mounted. The operating components comprise a revolver-shaped tool carrier 2, with a relative rotation actuator 3 for driving rotation about an axis H, and a vertical transfer platform 4 with relative linear actuator 5. On the head T a pneumatic distribution unit 6 is furthermore preferably provided, which puts a single pneumatic line, which runs across flange F, in communication with a plurality of lines to the various control members onboard the head.

Figure 4A:
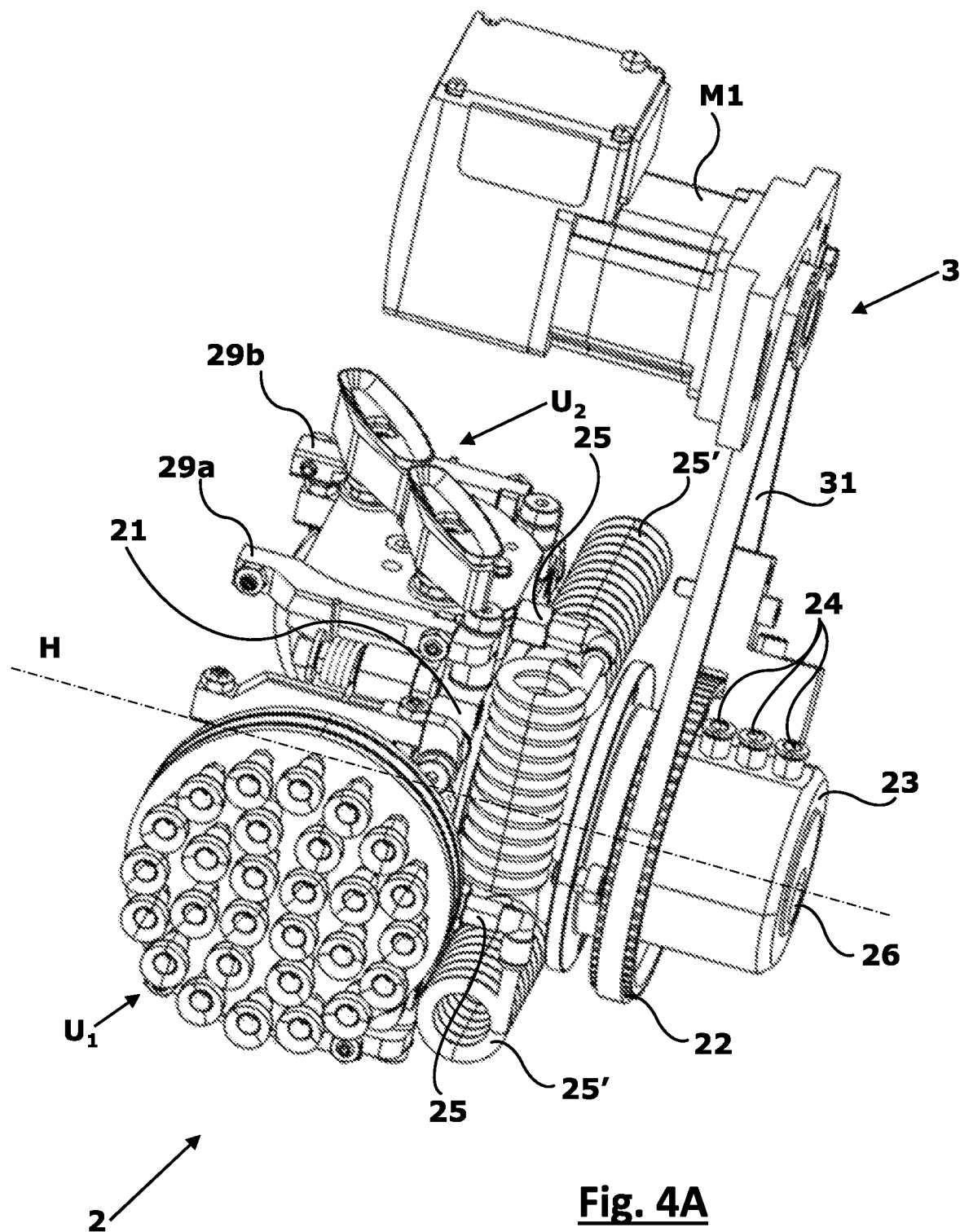
FIG. 4A is a perspective view of the revolver-shaped carrier according to an embodiment of the invention.
Figure 4C:
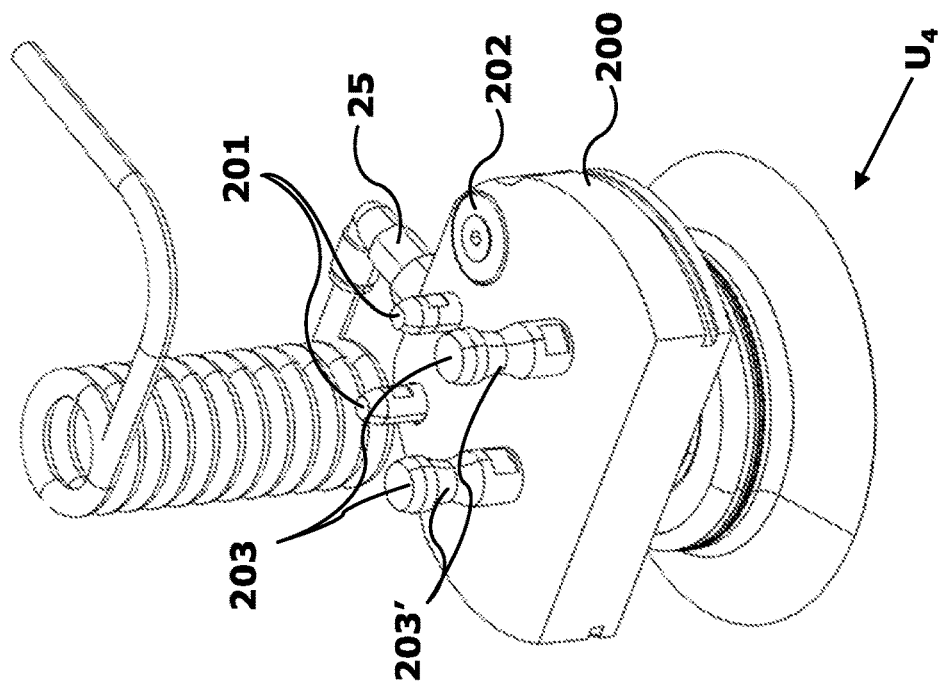
FIG. 4C is a perspective view of an exemplifying gripping tool.
Figure 4B:
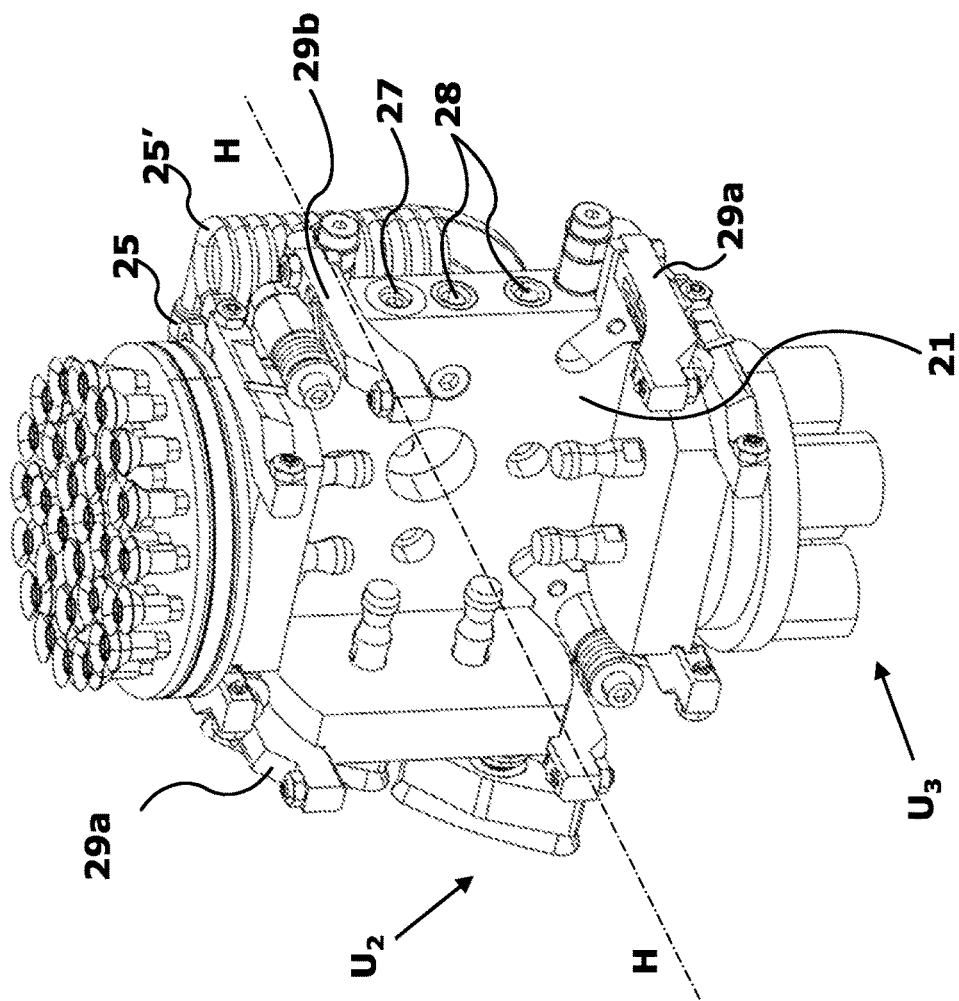
FIG. 4B is a perspective view of the support body of the revolver-shaped carrier of FIG. 4A.
Figure 8:
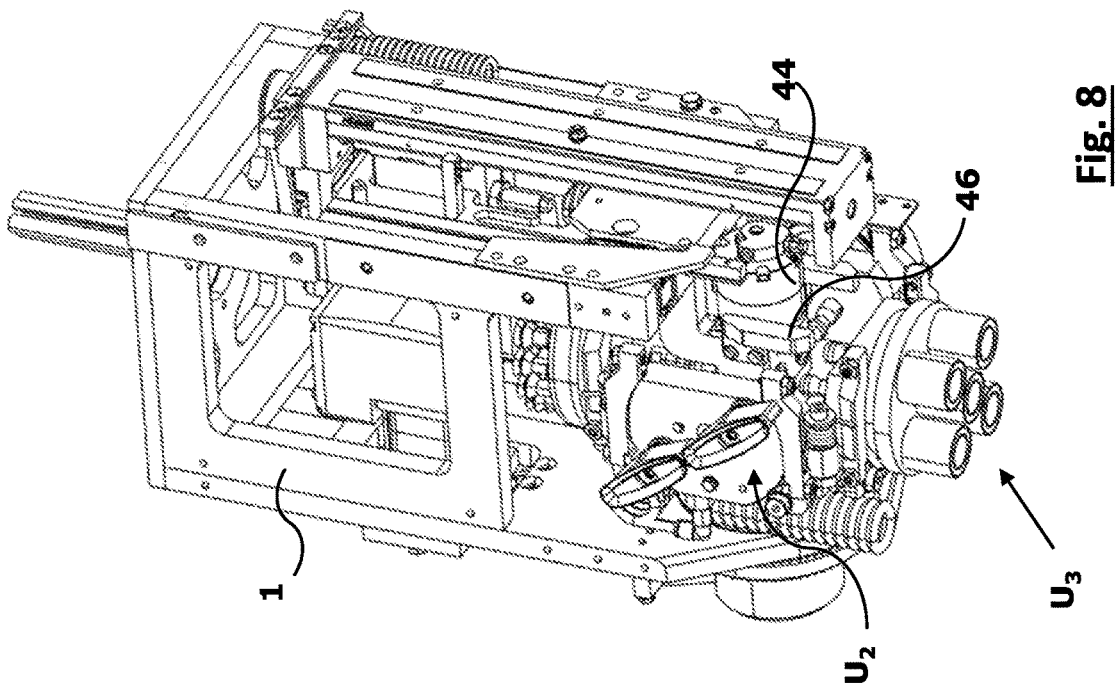
FIG. 8 is a similar view to that of FIG. 7 according to a different perspective.
Figure 7:
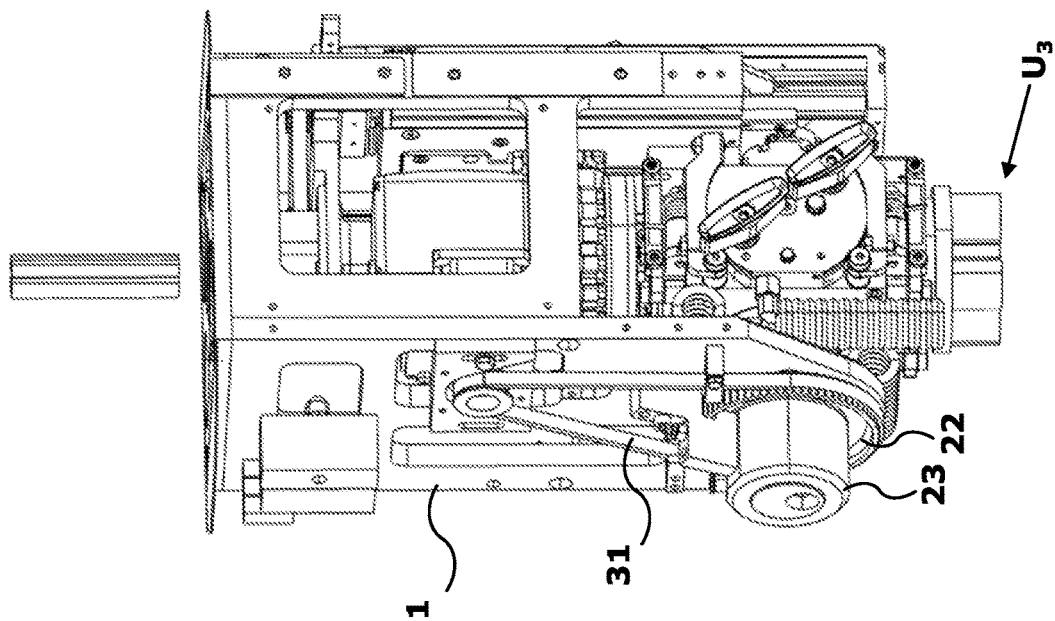
FIG. 7 is a perspective view as in FIG. 2 with cover bodies removed.
Figure 9:
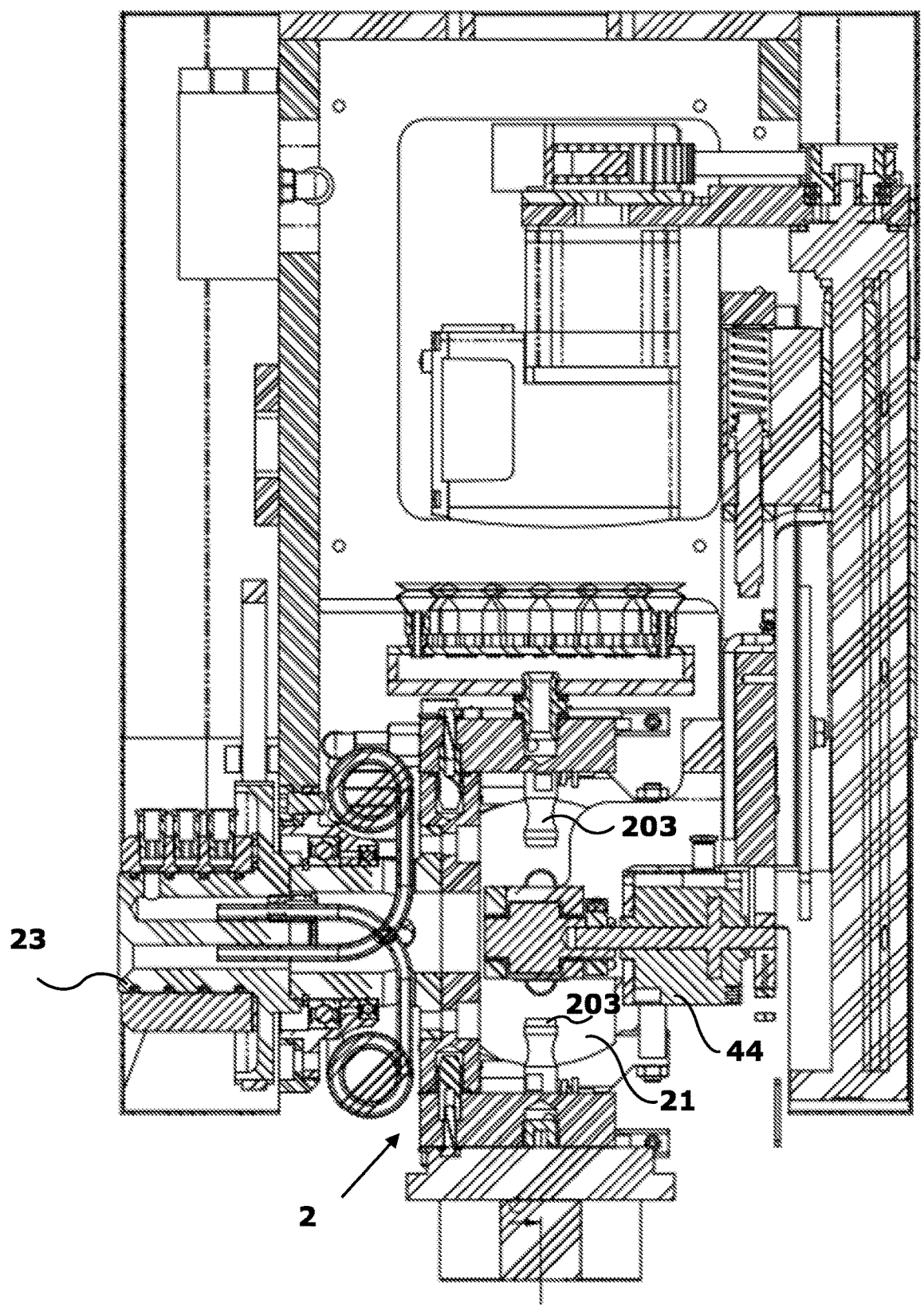
FIG. 9 is a longitudinal section view taken along a plane coplanar with a rotation axis of the revolver-shaped carrier.
Figure 11:
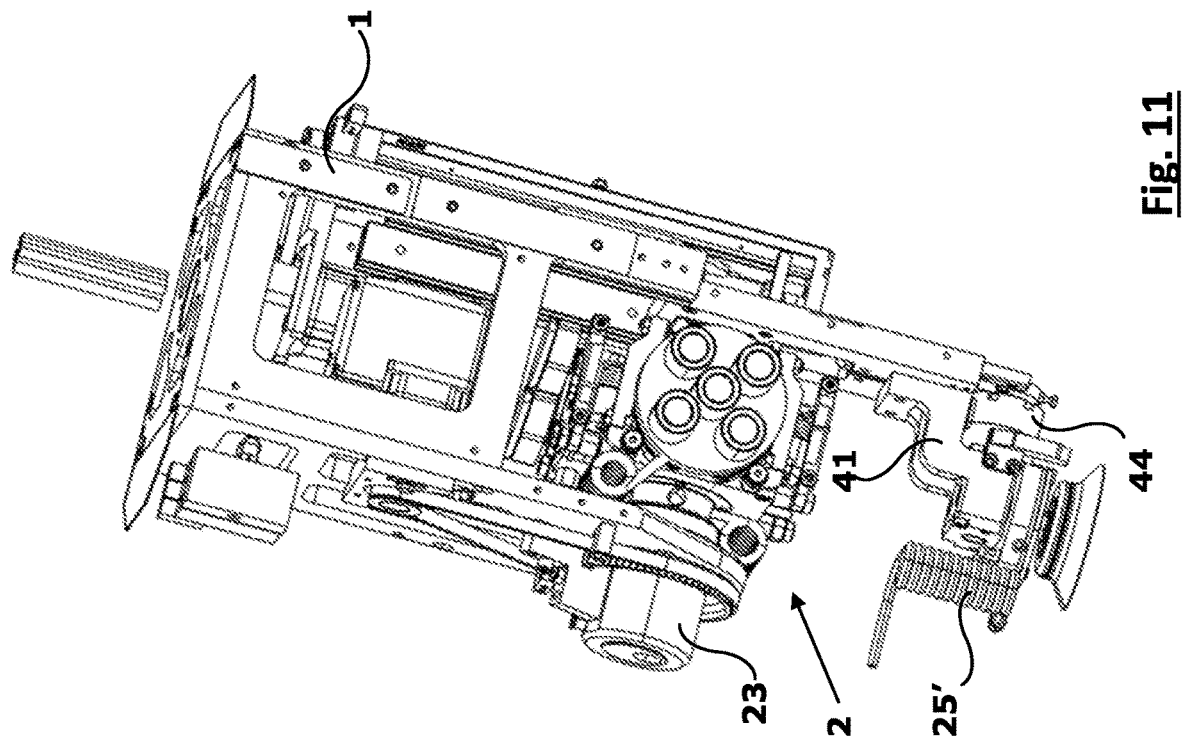
FIG. 11 is a perspective view, with cover bodies removed, of the gripping head of the invention in an extended operating condition.
Figure 10:
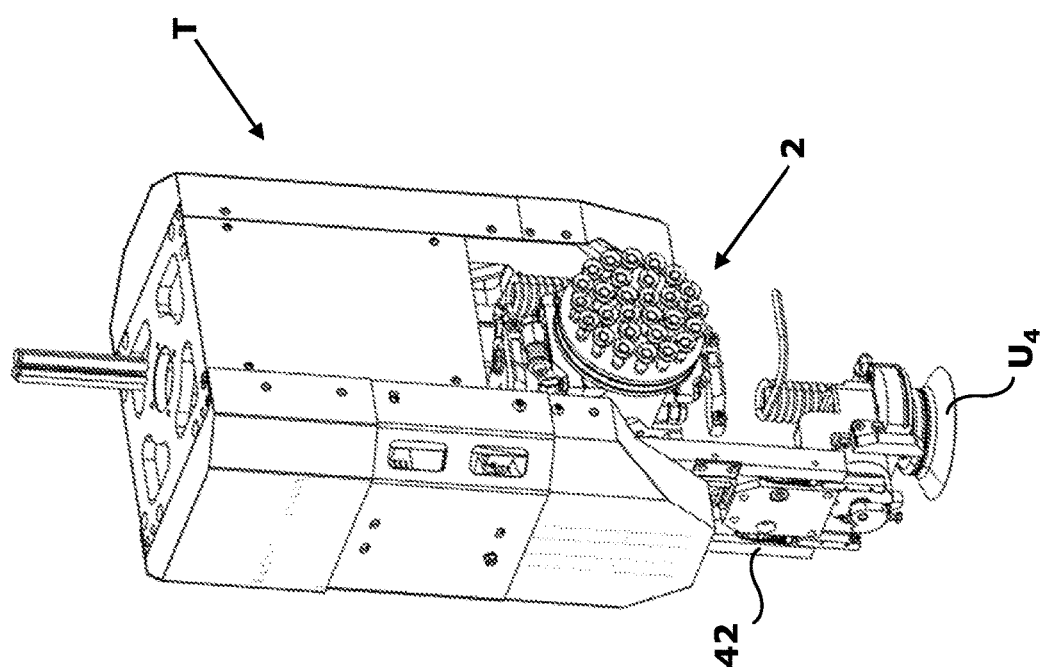
FIG. 10 is a perspective view of the gripping head of the invention in an extended operating condition.
Figure 13:
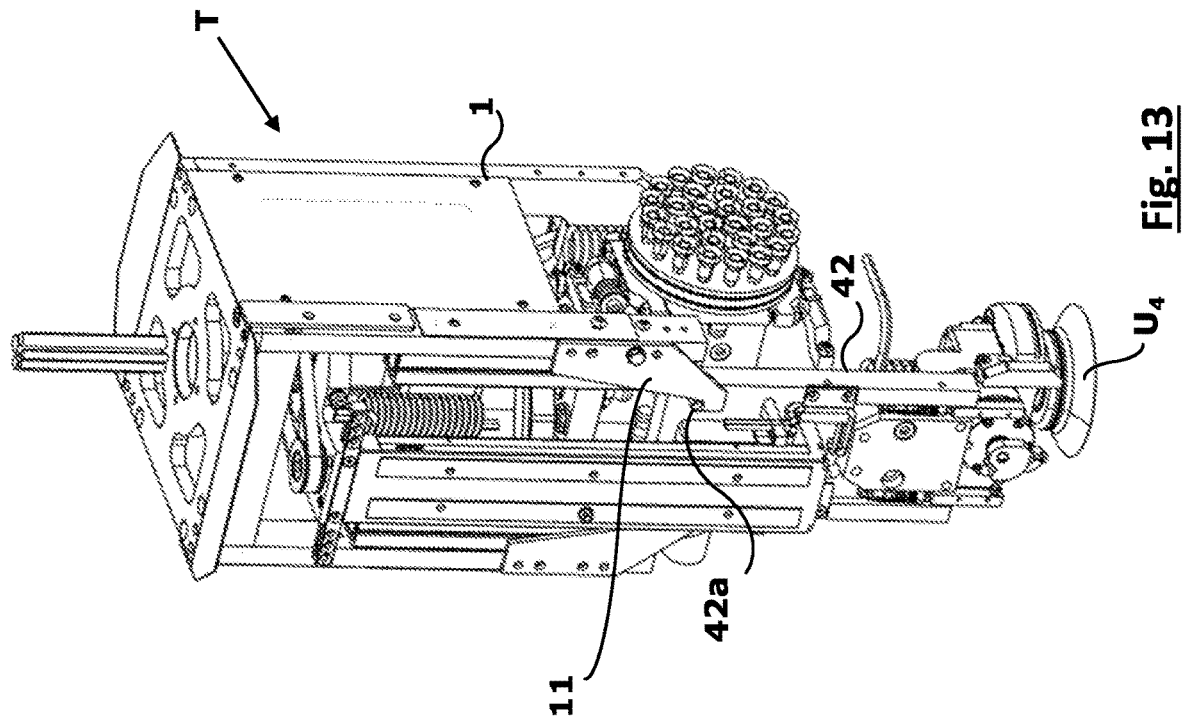
FIGS. 12 and 13 are views similar to that of FIG. 11 according to different perspectives.
Figure 12:
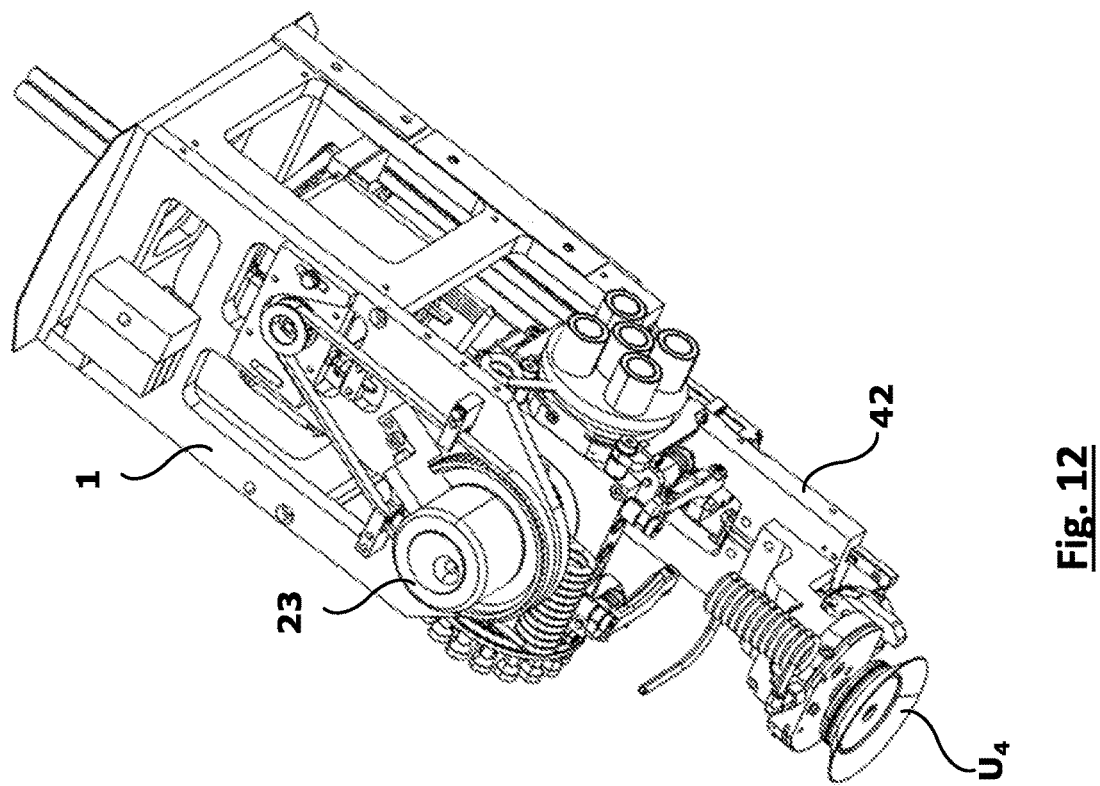
Figure 14:
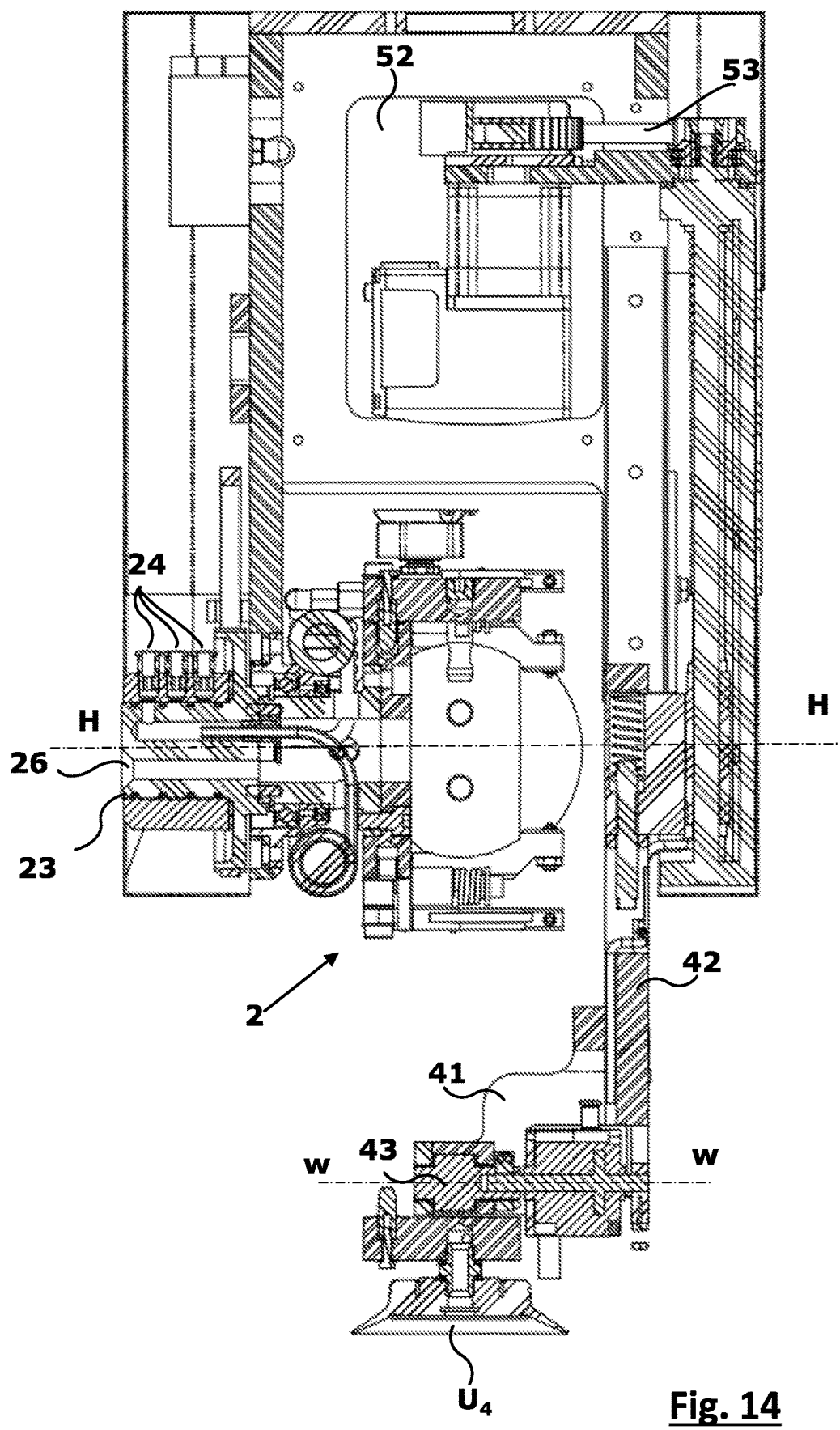
FIG. 14 is a view similar to that of FIG. 9 with the gripping head in an extended operating condition.

In FIGS. 4A and 4B the revolver-shaped tool carrier 2 with the actuator thereof 3 are illustrated in detail.

The revolver-shaped tool carrier 2 substantially comprises an engaging body 21, rotatably mounted around a selection axis H and driven into rotation by a pulley 22 actuated by an actuator 3 comprising a gear motor M1 and a toothed belt 31. On engaging body 21 some tools U are coupled, as will be better described further on.

Selection axis H is preferably horizontal.

Coaxially to pulley 22 a rotary fluid distributor 23 is preferably provided, fluidly connected to the engaging body 21. The distributor 23 has the purpose of giving continuity to a plurality of fluid pipes directed to the tools, connecting a plurality of input fluid connectors 24, arranged in a fixed position on the distributor, with a corresponding plurality of tool sockets provided on the movable gripping tools.

Fixed input connectors 24 on the distributor 23 are connected to pneumatic distribution unit 6, so as to suitably fluidly connect the vacuum line coming from the handling arm (not shown), down to the tool sockets 25 which are movably mounted in rotation on engagement body 21. For such reason, the vacuum suction creates a suction airflow from the tools to the top of the handling arm.

Preferably, between the tool sockets 25 and rotary fluid distributor 23, respective flexible and extendable hoses 25' are provided, for example spirally wound as shown in the drawings, to allow a continuity of the fluid pipe even when the tool is moved far away from rotary distributor 23 (as will be shown further on).

Rotary fluid distributor 23 preferably hosts in a central position a longitudinal through-hole 26, parallel to axis H, apt to house also an electrical through-wire, to supply other electrical devices, for example electromagnets 27 integral with engagement body 21 or other electromagnets onboard tools U.

The rotation control of gear motor M1 is preferably alternate, so as to perform rotations smaller than 360° in the two opposite directions. Thereby it is not necessary to provide a sliding contact to maintain the continuity of the electrical wire, but an alternate twist thereof in the two directions is tolerated.

In the embodiment shown, engagement body 21 is conceived to host four different tools $U_1$-$U_4$. For such purpose, body 21 takes up the shape of a square plate, with four orthogonal sides whereon an equal number of gripping tools $U_1$-$U_4$ are coupled. On each side, pairs of adjustment holes 28 and an electromagnet 27 are provided. Each side is furthermore equipped with a fork having a pair of elastic arms 29a and 29b, one elastically pushed towards the other for defining a gripping action on gripping tools $U_1$-$U_4$.

Electromagnet 27 and forks with elastic arms 29a and 29b overall form releasable engagement means, which could even take on different embodiments. They keep tools $U_1$-$U_4$ coupled with engagement body 21, but allow controlled detachment thereof, in the manners and times which are illustrated in the following.

The various gripping tools $U_1$-$U_4$ are all equipped with a universal fastening base 200 (FIG. 4C), whereto an active component is fastened which varies according to the type of tool. Base 200 is equipped with retaining means arranged so as to securely engage with the corresponding releasable engagement means present on the engaging body 21 of revolver-shaped carrier 2. In particular, base 200 has a pair of centring pins 201 meant to engage with corresponding centring holes 28 of engaging body 21, as well as a metal insert 202 meant to couple with electromagnets 27. On the same base 200 a pair of retaining pins 203 is furthermore provided, meant to engage with engagement means provided on transfer platform 4, as will be seen further on.

The lateral design of base 200 is conceived to cooperate with elastic arms 29a, 29b and to remain securely snap-engaged between them.

As shown in FIG. 4B, the engaging body 21 of revolver-shaped carrier 2 retains in a releasable manner four different tools, exploiting the engagement of centring pins 201 with centring holes 28 and the retaining snap force imparted by elastic arms 29a, 29b and by electromagnets 27. In FIG. 4B revolver-shaped carrier 2 is attached to three exemplifying gripping tools with different active components:

- a first tool $U_1$ with a plurality of circular vacuum suction caps,
- a second tool $U_2$ with two elongated vacuum suction caps, and
- a third tool $U_3$ provided with four electromagnet cylinders. A fourth tool $U_4$, provided with a single circular vacuum suction cap, has been spaced away and is shown isolated in FIG. 4C.

FIG. 4D shows a further preferred tool $U_5$ (for example mountable on the gripping head instead of tool $U_3$), provided with two concentric electromagnets apt to be controlled independently. In particular, a first central electromagnet is of a circular shape and has a diameter ranging between 25-35 mm: this is meant to collect smaller workpieces (up to a maximum of about 40 kg). A second peripheral electromagnet is of an annular shape: it is meant to contribute with an auxiliary force to that of the first electromagnet when the workpiece to be collected exceeds 40 kg of weight, up to a maximum of about 130 kg. The activation of the electromagnets can be alternatively controlled on the two or simultaneously. A tool with triple-fold geometry and different load carrying capability is thus offered, programmable depending on the workpieces to be collected.

FIG. 5A shows in detail transfer platform 4 with relative linear actuator 5, both mounted on frame T.

According to the embodiment shown, transfer platform 4 comprises a shelf 41 fastened to a moving slider 42 slidably mounted along a sliding axis Y. Sliding axis Y is preferably vertical.

Shelf 41 is provided with engagement means, with which it can be securely fastened, in a releasable manner, to a selected gripping tool.

It must be noted that shelf 41 supports cantilevered engagement means, at a certain distance from the moving slider 42 in the direction of the central axis of the gripping head. In particular, the engagement means are in a central area where they can engage, when desired, with retaining means of gripping tools $U_1$-$U_5$.

According to the embodiment shown, the releasable engagement means consist of a shaft 43, supported in rotation on a terminal body 41' of shelf 41 and driven into alternate rotation by a pneumatic actuator 44.

The rotation axis of shaft 43 and of actuator 44 is identified as axis W in the drawings.

Shaft 43 has at least a portion wherein the crosswise section has two different orthogonal dimensions, a shorter and a longer one: for example, cylindrical-section shaft 43 is provided with two opposite lateral recesses 43a (FIG. 5C). Shaft 43 is meant to engage with a fork feature defined between the two retaining pins 203 of tools $U_1$-$U_5$, alternatively offering a larger or a smaller diameter and hence preventing from or allowing, respectively, a relative crosswise disengagement movement.

Accordingly, the two retaining pins 203 of gripping tools $U_1$-$U_5$ have a narrower-section portion 203'. In correspondence of such narrower section, the centre-to-centre distance between the surfaces of the two pins is greater than the smaller dimension of shaft 43 in correspondence of recesses 43a. Thereby, the two retaining pins 203 can freely slide crosswise across shaft 43 in correspondence of recesses 43a, while the crosswise displacement is prevented if the larger section of shaft 43 lies between the two narrower sections 203' of pins 203.

In other words, depending on the rotation angle taken up by shaft 203, it is possible to keep the pair of retaining pins 203 crosswise captured or free, as will be better described further on.

The terminal body 41' of shelf 41 furthermore has guiding parallel holes 45 to host the pair of retaining pins 203. Guiding parallel holes 45 are orthogonal to shaft 43 and intersect the rotation seat thereof, on the two opposite sides of its rotation axis W. Thereby, when retaining pins 203 are inserted into guiding holes 45, they can engage laterally with shaft 43.

Moreover, on shelf 41 a pair of opening cam members 46 is installed, arranged on the opposite sides of shaft 43, which are designed to come in contact and spread open elastic arms 29a and 29b in an attachment step.

Movable slider 42 is controlled in its rectilinear movement by means of a linear actuator 5, for example ball screw 51 driven into rotation by an electric motor 52 by means of a transmission belt 53.

Preferably, linear actuator 5 controls movable slider 42 by means of a floating joint 54 which transfers a driving force through an elastic member, for example a helical spring. Floating joint 54 has the purpose of compensating any misalignment between the linear actuator and the platform, ensuring that in any case the movement control along axis Y be transmitted to transfer platform 4 without jamming.

Actuator 5 is configured (FIG. 5A) to move transfer platform 4 between a home position, wherein movable slider 42 is in the upper position, an attaching position, wherein transfer platform 4 is attached to a desired tool (as will be described further on), and one or more operating positions wherein slider 42 descends to lower positions along axis Y and the tool attached to platform 4 is progressively extended below the gripping head.

In the home position (FIG. 6A), movable slider 42 is in its upper position and keeps shelf 41 with shaft 43 in a substantially centred position with respect to revolver-shaped carrier 2: axis W is in the proximity of axis H. In this condition, revolver-shaped carrier 2 can freely rotate around axis H and the tools surround shelf assembly 41 and actuator 44 without interference. As a matter of fact, for such purpose, tools $U_1$-$U_5$ are engaged with support body 21 at a radial distance from rotation axis H sufficient to leave space to shelf assembly 41 and to the actuator 44 thereof.

In the attachment position (FIG. 6B), movable slider 42 is shifted vertically downwards by a measure sufficient to bring the body 41' of shelf assembly 41 in engagement with a selected tool U, that is the tool which is in the lower position on revolver-shaped carrier 2, for example tool $U_4$ in the drawing. In such condition, retaining pins 203 are engaged with guiding holes 205 and the respective reduced-section areas 203' are in the proximity of the lateral surface of shaft 43.

In this position, depending on the rotation angle taken up, shaft 43 is captured or released from the two retaining pins 203.

In FIGS. 6B and 6C shaft 43 is facing its larger diameter to the two opposite retaining pins 203 (as a matter of fact recess 43a is visible in the upper part of the shaft) and hence it is locked between them: in this condition, tool $U_4$ and transfer platform 4 are made integral, along a horizontal axis parallel to axis W due to the engagement of pins 203 with holes 45, as well as a vertical axis parallel to axis Y due to the engagement of shaft 43 between pins 203.

Viceversa, when shelf 41 is getting closer to chosen tool U, the relative movement along the vertical axis must be allowed and shaft 43 is rotated by 90°, so that its smaller diameter parts (recesses 43*a*) are facing the two opposite retaining pins 203. In the tool attachment step, the pair of opening wedges 46 comes in contact and spreads apart elastic arms 29*a* and 29*b*, which hence no longer retain tool U to the revolver-shaped carrier: as long as shaft 43 is not rotated and engages the two retaining pins 203, the tool is maintained joined to the revolver-shaped carrier 2 only by the action of electromagnet 27. Once the tool has been ultimately attached to transfer platform 4, electromagnet 27 can be deactivated 27, so that the tool is fully released from revolver-shaped carrier 2 and can be moved integrally with transfer platform 4.

Once the desired tool U has been made integral to transfer platform 4 and released from revolver-shaped carrier 2, shelf assembly 41 can be shifted into operating positions far away from the gripping head, by means of a further translation of slider 42 along vertical axis Y.

In FIGS. 10-14 various views of the gripping head are shown with a tool $U_4$ extended downwards in an operating position, with slider 42 extended to its maximum extension.

In this condition, selected tool U is at a sufficient distance from the gripping head to be able to easily act on the workpieces to be collected without being affected by the greater bulk of revolver-shaped carrier 2 and by the entire gripping head T.

In order to prevent the weight resting on the gripping tool from being applied to linear actuator 5, stopping means are preferably provided which, in the travel end operating position, securely fasten slider 42 directly to the structure of frame 1. In the embodiment illustrated in FIG. 13, these stopping means are in the shape of a pair of pins 42*a* integral with slider 42 which abut against a pair of hooks 11 integral with frame 1. In this case, too, due to the presence of floating joint 54, it is not necessary to provide a fine adjustment of the stopping means, because any mounting inaccuracies are absorbed by floating joint 54 without causing jamming or damage to the control members.

In FIGS. 15-22 the different selection steps of the gripping head according to the invention are illustrated.

Figure 15:
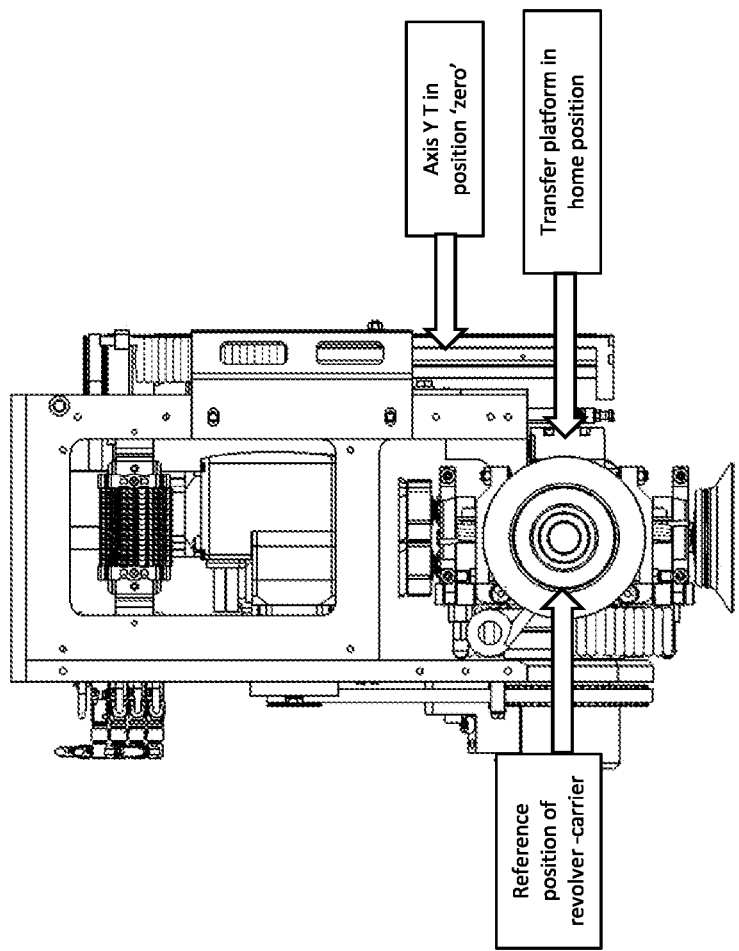

In FIG. 15 gripping head T is in a reference condition, with revolver-shaped carrier 2 which takes up a rotation angle of "zero" and transfer platform 4 in the upper home position.

Figure 16:
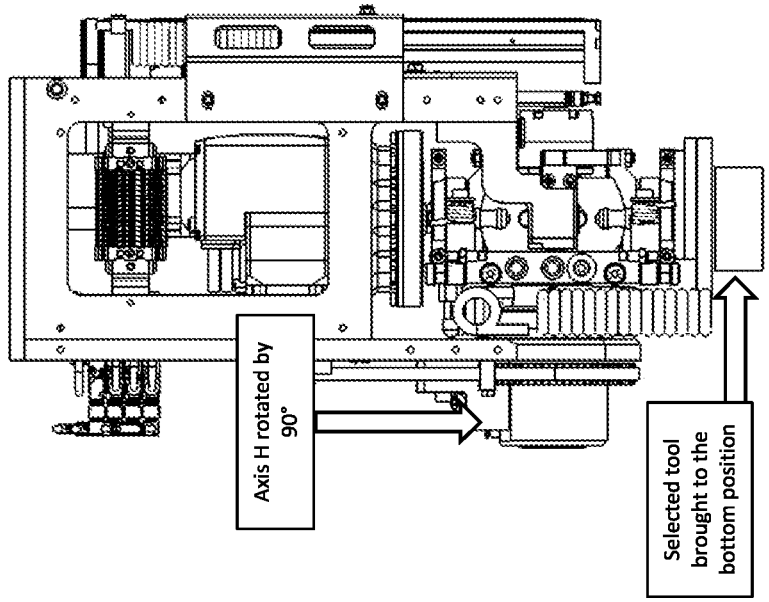
FIGS. 15-22 are elevation side views of the gripping head with the cover bodies removed which represent an operation sequence of the invention.

In FIG. 16 tool $U_4$ has been selected, which is brought into the lower position by means of a rotation of revolver-shaped carrier 2 around axis H, for example with a rotation by 90°.

Figure 17:
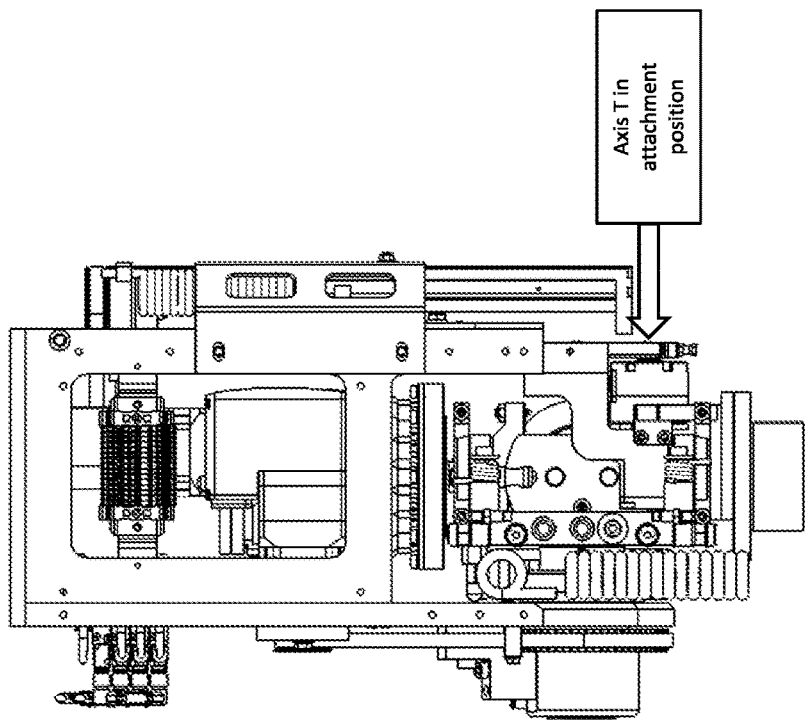

In FIG. 17 transfer platform 4 is moved into the attachment position, so as to engage retaining pins 203 with guiding holes 45 and to spread apart elastic arms 29*a* and 29*b*. The tool is still retained on revolver-shaped carrier 2 by the action of electromagnet 27.

Figure 18:
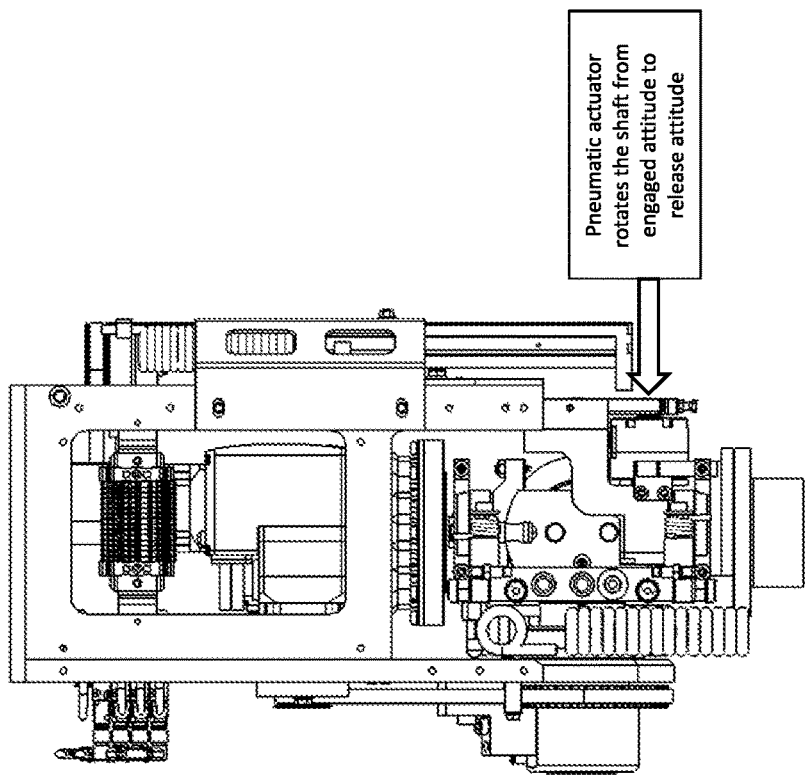

In FIG. 18 the step of the final engagement of the tool with transfer platform 4 is shown. Pneumatic actuator 44 rotates shaft 43, so as to determine the capture thereof between the two retaining pins 203 and clamp the tool $U_4$ to the transfer platform 4 also along movement axis Y. Electromagnet 27 is deactivated, so as to fully release the tool from revolver-shaped carrier 2.

Figure 19:
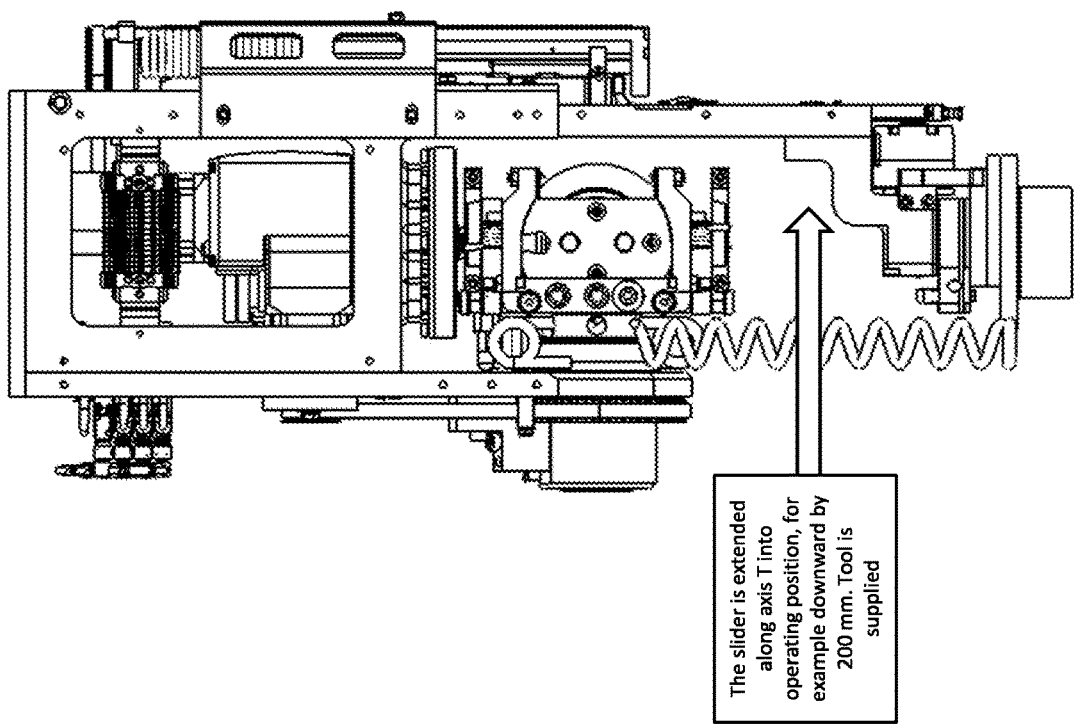
Figure 22:
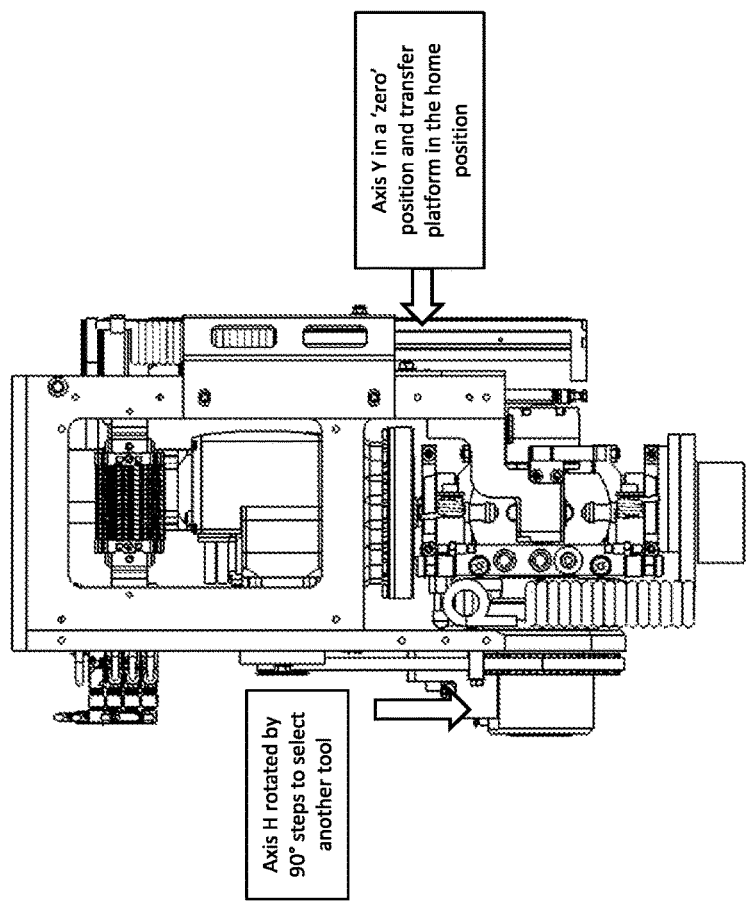

In FIG. 19 an operating step of the tool is shown. Slider 42 is extended downwards, bringing tool $U_4$ into an operating position, for example 200 mm below the attachment position. In this step tool $U_4$ is powered by the control line or by energy transfer consistent with the function thereof, for example a vacuum suction is activated along extensible pipe 25'.

In this condition, gripping head T performs the programmed work with the selected tool in an operating position. For example, a fresh metal sheet is collected and it is transferred to the entry of a cutting centre.

Figure 20:
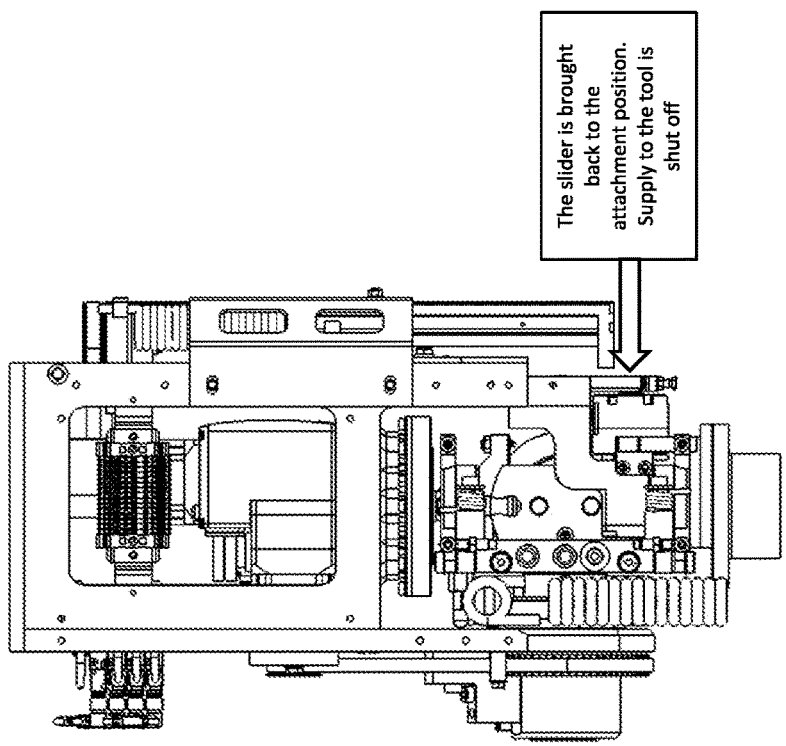

At the end of this work cycle, in case it is necessary to perform a different grip with a different tool, the current tool is brought back into the attachment position and the power supply along the control line is discontinued (FIG. 20).

Figure 21:
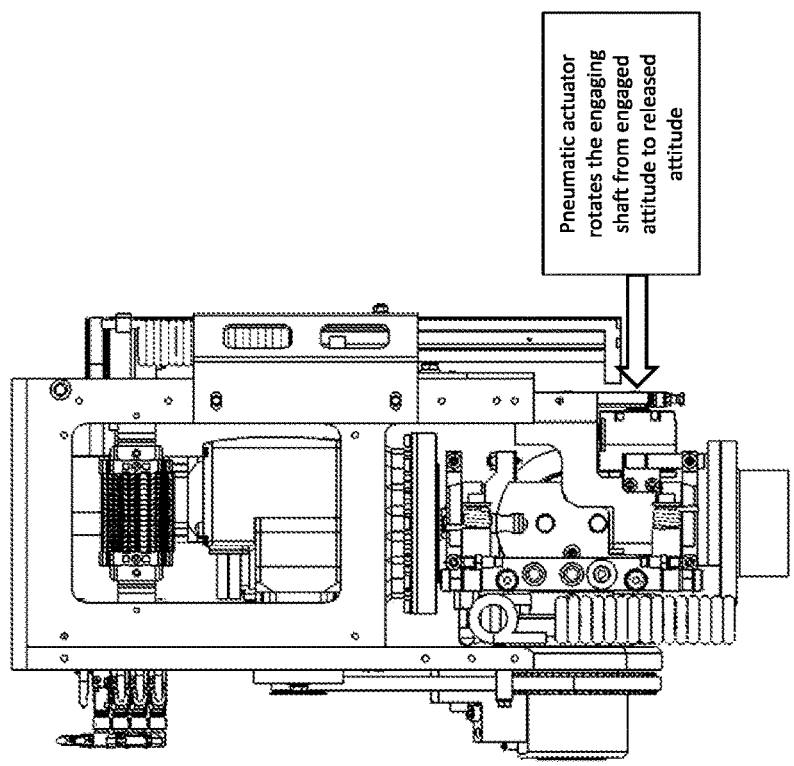

Transfer platform 4 is brought back into the attachment position, the current tool is released from shaft 43 and taken back by electromagnet 27 (FIG. 21). After that, transfer platform 4 returns into its home position (FIG. 22), the tool is securely engaged again also by elastic arms 29*a* and 29*b* and revolver-shaped carrier 2 can rotate again to perform a new selection of the desired tool.

Due to the specific layout of the head according to the invention, all the tools onboard the revolver-shaped carrier are in any case securely engaged, through electromagnet 27 and elastic arms 29*a* and 29*b*, as well as correctly (electrically or pneumatically) supplied: therefore they are perfectly operative and there is no hindrance with respect to the transfer platform in a home position. Therefore that allows to exploit an additional operating mode. As a matter of fact the tools, despite remaining onboard the revolver-shaped carrier, can be used to collect workpieces of a non-excessive weight (because the load is supported by rotation axis H and by releasable engagement means which do not impart a high force, at least in the layout provided in the preferred embodiment).

Figure 23A:
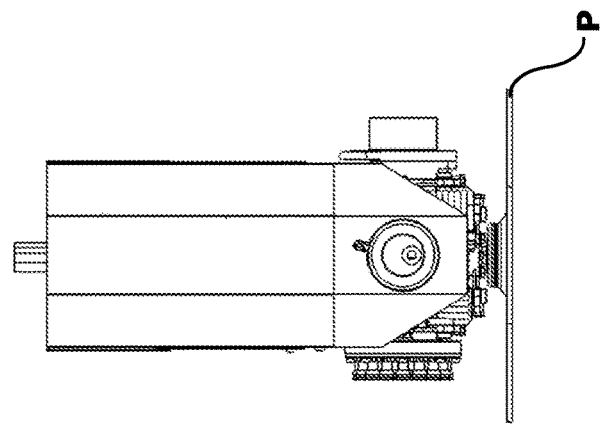
FIGS. 23A-23C are elevation side views of the head of FIG. 23 in a rotation sequence of a drawn workpiece.
Figure 23C:
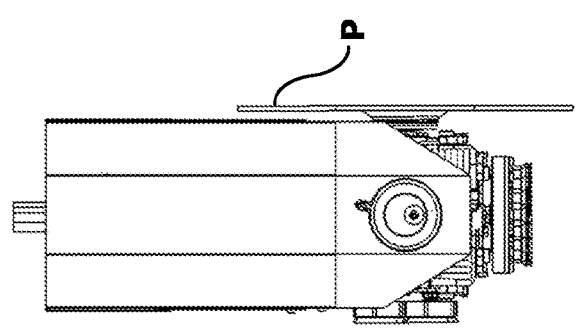
Figure 23:
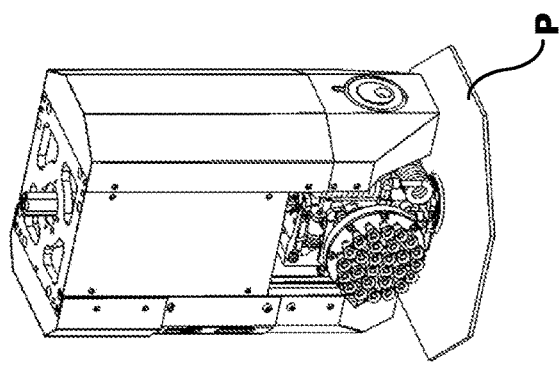
FIG. 23 is a perspective view of the head according to the invention which collects a workpiece with a tool kept in the revolver-shaped carrier.
Figure 23B:
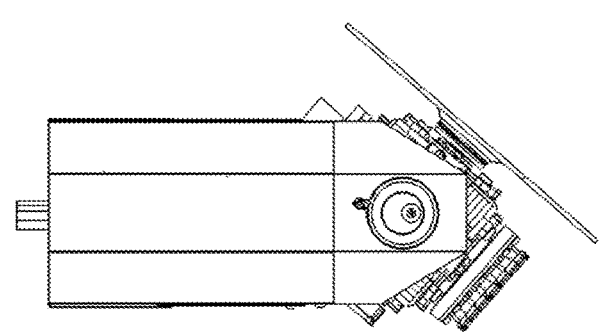

Thereby, the workpieces can also be rotated on a horizontal axis (that is axis H) and then can be brought from a horizontal attitude to an inclined attitude, to be laid onto racks or feeders in a row of adjacent workpieces (instead of stacked one on top of the other). A welding station, an anthropomorphic robot or in any case an automation station could benefit from a non-horizontal deposition. As illustrated in the sequence of FIGS. 23-23C, a workpiece P can be collected in a horizontal attitude and then progressively rotated into a vertical attitude by rotating the revolver-shaped carrier around axis H.

As can be clearly understood from the description reported above, the gripping head for a sorting apparatus and the relative operating method according to the present invention allow to perfectly reach the set objects.

As a matter of fact, the gripping head is arranged so as to have onboard a series of different tools, mounted on a revolver-shaped carrier: therefore the selection of the required tool can occur in a short time, without having to move the gripping head in a peripheral carrier area where to perform the change of tool. That allows understandable time savings in the operating cycle.

The provision of a revolver-shaped carrier, which supports a plurality of fully operating tools in a rotary manner around a horizontal axis, offers further advantages in the handling of the workpieces.

Moreover, the pick-up action of the selected tool to the transfer platform allows to displace the individual tool at a sufficient distance from the tool carrier, so that no particular work constraints of the tool arise despite the bulk of the same tool carrier. The gripping head can hence operate in an identical manner to the conventional single-tool handlers, but in a much faster and flexible manner.

However, it is understood that the invention must not be considered limited to the particular embodiment illustrated, but that different variants are possible, all within the reach of a person skilled in the field, without departing from the scope of protection of the invention, which is only defined by the following claims.

For example, although in the description reference has always been made to a revolver-shaped carrier with four tools and relative releasable engagement means, it is not ruled out that more than four tools can also be mounted on the carrier unit, also depending on the bulk of each of said tools.

Moreover, it is understood that by the expression 'revolver-shaped carrier' it is also meant a rotating tool rack, tool carousel, tool turret, but also carrier units for multiple tools with a different selection movement are recomprised, for example a linear movement or movement with more complex displacements, provided they allow a selection of a desired tool which is housed in a certain position of a movable carrier from which it can be picked up and spaced away by the transfer platform.

Finally, it must be noted that the tool engagement and retaining means could also differ significantly from the ones illustrated in the drawings, despite falling within the teachings offered here.

The invention claimed is:

1. Gripping head of a handler in a sorting machine, comprising:
    a support frame,
    plural gripping tools, equipped with at least a socket for a control line and first retaining means,
    a revolver-shaped carrier mounted on said support frame equipped with an engaging body provided with a plurality of first releasable engagement means apt to be coupled with said first retaining means of a respective one of said gripping tools, said plurality of gripping tools furthermore having second retaining means,
    at least a transfer platform, equipped with second releasable engagement means apt to be coupled with said second retaining means,
    said transfer platform being movably mounted on said support frame along a sliding axis between at least an attachment position, wherein said second releasable engagement means are coupled with said second retaining means of a selected one of the gripping tools, and
    an operating position, wherein said first retaining means of said selected gripping tool are uncoupled from said first releasable engagement means and said selected gripping tool is spaced away from said revolver-shaped carrier, and
    wherein said engaging body is rotatably mounted around a selection axis which is perpendicular to said sliding axis.

2. The gripping head of claim 1, wherein said revolver-shaped carrier is controlled in different selection positions by a rotary actuator.

3. The gripping head of claim 2, wherein between said rotary actuator and said revolver-shaped carrier a rotary flow distributor is provided to connect a flow pipe for said gripping tools from a fixed position to said sockets for a control line which is integral in rotation with said revolver-shaped carrier.

4. The gripping head of claim 3, wherein said first releasable engagement means comprise a fork having elastic arms and at least an electromagnet.

5. The gripping head of claim 3, wherein said transfer platform comprises a shelf assembly cantilever mounted on a displacement slider controlled by a linear actuator.

6. The gripping head of claim 2, wherein said first releasable engagement means comprise a fork having elastic arms and at least an electromagnet.

7. The gripping head of claim 2, wherein said transfer platform comprises a shelf assembly cantilever mounted on a displacement slider controlled by a linear actuator.

8. The gripping head of claim 1, wherein said first releasable engagement means comprise a fork having elastic arms and at least an electromagnet.

9. The gripping head of claim 8, wherein said transfer platform comprises a shelf assembly cantilever mounted on a displacement slider controlled by a linear actuator.

10. The gripping head of claim 9, wherein between said displacement slider and said linear actuator a floating joint is provided, apt to transfer a control action by elastic means.

11. The gripping head of claim 10, wherein said shelf assembly comprises a terminal body equipped with two guiding parallel holes which intersect a perpendicular housing seat wherein a shaft with a portion having a non-circular section is rotatingly supported.

12. The gripping head of claim 9, wherein said shelf assembly comprises a terminal body equipped with two guiding parallel holes which intersect a perpendicular housing seat wherein a shaft with a portion having a non-circular section is rotatingly supported.

13. The gripping head of claim 12, wherein said shaft is driven into rotation by a two-position rotation actuator.

14. The gripping head of claim 9, wherein on said shelf a pair of opening wedges is furthermore installed, arranged to come in contact with and spread apart said elastic arms.

15. The gripping head of claim 1, wherein said revolver-shaped carrier is controlled by a rotary actuator.

16. The gripping head of claim 1, wherein said first releasable engagement means comprise a fork having elastic arms.

17. The gripping head of claim 1, wherein said transfer platform comprises a shelf assembly cantilever mounted on a displacement slider controlled by a linear actuator.

18. The gripping head of claim 1, wherein said transfer platform comprises a shelf assembly cantilever mounted on a displacement slider.

19. An operating method of a gripping head for a handler in a sorting machine, wherein,
    said gripping head provides a support frame whereon a revolver-shaped carrier is housed with a plurality of gripping tools, a selection actuator for said revolver-shaped carrier, a transfer platform and a linear actuator for said transfer platform, said transfer platform being slidably mounted along a sliding axis,
    the operating method comprising:
    selecting a desired one of said gripping tools on said revolver-shaped carrier by means of said selection actuator through rotation about an axis which is perpendicular to said sliding axis,
    displacing said transfer platform along a sliding axis by means of said linear actuator from a home position to an attachment position wherein it is coupled with said selected desired one of said gripping tools,
    releasing said selected desired one of said gripping tools from said revolver-shaped carrier and transferring it integrally to said transfer platform in an operating position spaced away from said revolver-shaped carrier, and performing a gripping cycle with said selected desired one of said gripping tools.

* * * * *